April 29, 1924.   F. DRUCKENMUELLER   1,492,438

WHEEL PROTECTOR

Filed Jan. 5, 1923

INVENTOR
FRANZ DRUCKENMUELLER
BY Munn & Co.
ATTORNEYS

Patented Apr. 29, 1924.

1,492,438

UNITED STATES PATENT OFFICE.

FRANZ DRUCKENMUELLER, OF COLN-NIPPES, GERMANY, ASSIGNOR TO RHEINISCHE GUMMIWARENFABRIK AKTIEN-GESELLSCHAFT DROSSELWEG 49, OF COLN-NIPPES, GERMANY, A FIRM.

WHEEL PROTECTOR.

Application filed January 5, 1923. Serial No. 610,386.

*To all whom it may concern:*

Be it known that I, FRANZ DRUCKENMUELLER, a citizen of the Republic of Germany, and resident of Coln-Nippes, Germany, have invented a new and Improved Wheel Protector, of which the following is a full, clear, and exact description.

This invention has for its object to provide an improved and decorative facing member for one or both sides of an automobile wheel, and in connection therewith a novel and valuable automobile wheel structure.

Heretofore attempts have been made to construct an automobile wheel of the spoked type with auxiliary members in the nature of disks extending from hub to tire rim. Such facing members have usually been tinplate disks having to be fastened by means of screws or the like to the rim and the hub. Such previous coverings have the disadvantage of comparative complication and the necessity of consuming much time in removing the covering when a tire must be changed or inflated. Quite a serious disadvantage has resided in the fact that a covering of the kind just described loosens easily and clatters, thereby incidentally increasing the general liability of such a covering to become marred.

As will be seen in a moment, the present invention removes all of the disadvantages mentioned, and has many advantages of its own. Essentially the present invention provides, as a new article of manufacture, a facing sheet for an automobile wheel, formed of elastic material, as rubber or the like, and preferably so shaped that no special fastening means are required at the hub, as such sheet is held on the hub by its own inherent elasticity. The outer marginal portion of the new disk is secured to the wheel rim in such a way as to set up slight radial stretches in the sheet of elastic material, as the result of the provision, as a preferable feature of the present invention, of very simple and easily manipulated clamping means to engage such outer marginal portion of the elastic sheet and anchor the same on the wheel structure adjacent to the tire rim.

The invention will be more clearly understood from the following description when taken in connection with the accompanying drawing, showing an illustrative embodiment of the invention as at present preferred, the scope of protection contemplated being indicated by the appended claims.

In this drawing—

Figure 1:
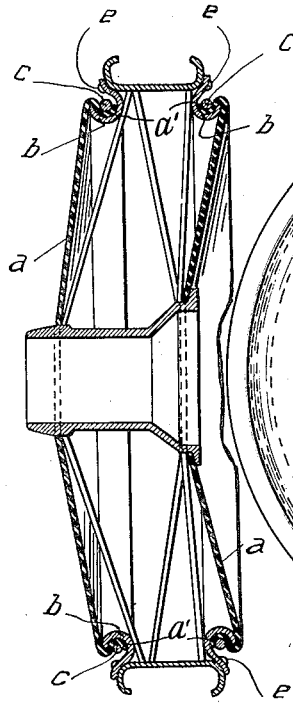
Figure 1 is an axial section of the new wheel structure, showing a type of wire-spoked wheel equipped with the new facing members on opposite sides.
Figure 2:
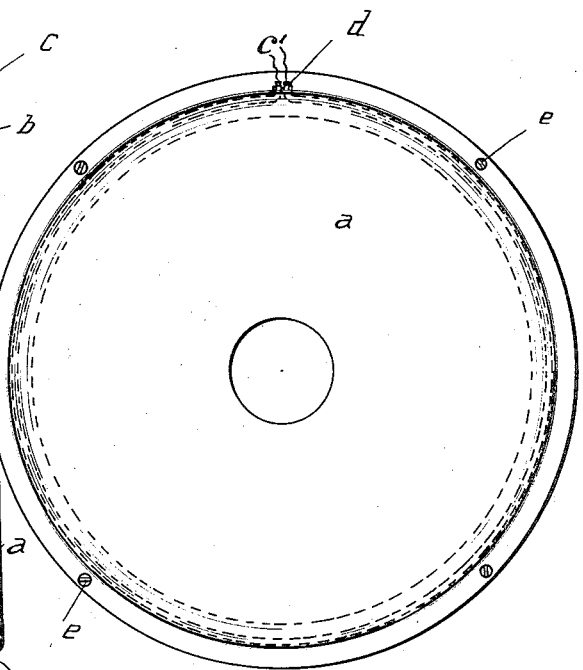
Fig. 2 is a side elevation.
Figure 3:
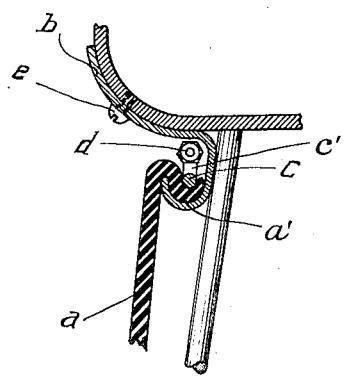
Fig. 3 is a fragmentary view on an enlarged scale showing a detail of construction.
Figure 4:
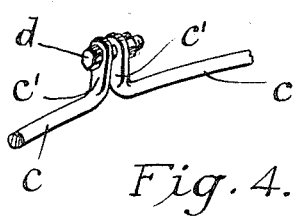
Figure 4 is a side view partly in section of a portion of the clamping wire and its securing bolt.

It will be seen from the drawing that the automobile wheel here shown includes, conventionally, a hub, a tire rim, and spacing means formed as wire spokes. The new disk is indicated at $a$. This disk is provided with a central opening smaller than the hub so that when applied it fits tightly on the hub of the wheel, as shown. The outer marginal portion or border of the disk is shaped or beaded as indicated at $a'$, and is placed over and tucked within a special continuous groove $b$, formed of sheet metal or the like, and attached to the usual tire rim as by means of screws $e$. It will be seen that the marginal portion of the disk $a$ is so formed that when thus tucked in the continuous groove $b$, a clamping and tensioning member $c$ is seated over the tucked-in portion. This member $c$ is a circularly bent clamping wire, rod, or the like, having outturned and apertured ends $c'$ through which the bolt $d$ passes whereby the curvature of such member may be varied.

It will thus be seen that it is a very simple operation to mount the new facing sheet or disk $a$ on an automobile wheel, and that such mounting may be done very quickly, and to give the main portion of the sheet the correct degree of tautness, and all without the use of any special tools. In order to remove the disk, it is only necessary to remove the single screw-bolt $d$.

Various slight changes may be made in the general form and arrangement of the parts described without departing from the invention, and hence we do not limit ourselves to the precise details set forth but consider ourselves at liberty to make such changes and alterations as fairly fall within the spirit and scope of the appended claims.

I claim:

1. As a new article of manufacture, a facing disk for an automobile wheel formed of rubber and having a marginal bead and a central opening to sleeve the wheel hub and frictionally engage the same.

2. In an automobile wheel, the combination with a wheel structure, including a hub, a tire rim, and spacing means between the hub and rim, of a facing sheet for the wheel extending between the hub and rim and formed of elastic material and held on the hub by its elasticity, and means for fastening the outer border of the sheet to the rim.

3. The wheel defined in claim 2, wherein said fastening means includes a continuous groove carried by the rim in addition to the usual tire groove, into which the outer border of the sheet may be tucked, and a fastening device for securing the tucked portion of the border in the groove.

4. The wheel defined in claim 2, wherein said fastening means includes a continuous groove carried by the rim in addition to the usual tire groove, into which the outer border of the sheet may be tucked, and an adjustable ring to be engaged over said tucked-in portion of the sheet for clamping the latter in place in said continuous groove.

5. In an automobile wheel, the combination of a facing sheet for the wheel formed of rubber and having a central opening to engage the wheel hub, thereby to constitute said sheet an annulus extending at its outer marginal portion adjacent to the tire rim of the wheel, and means for fastening said outer portion of the sheet on the wheel to stretch the annulus radially.

6. The wheel defined in claim 5, wherein said means includes a circularly bent clamping member and an adjustable device associated with its opposite ends whereby the curvature of such member may be varied.

7. In a wheel, the combination with a hub, a rim having an annular groove on each side, and spacing means between the hub and rim, of facing disks of elastic material having central openings receiving the hub and having their marginal portions in the said grooves, rings engaging the portions of the disks in the grooves and having out-turned apertured ends, and bolts in the apertures of the said ends.

FRANZ DRUCKENMUELLER.